Jan. 7, 1936.                    H. J. DILLON                    2,026,826
FRAMELESS TANK VEHICLE
Filed March 28, 1934                   4 Sheets-Sheet 1
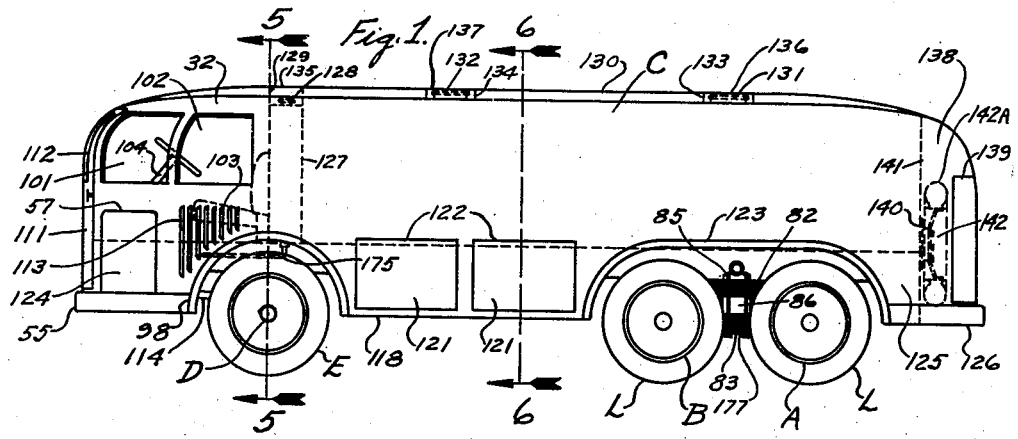
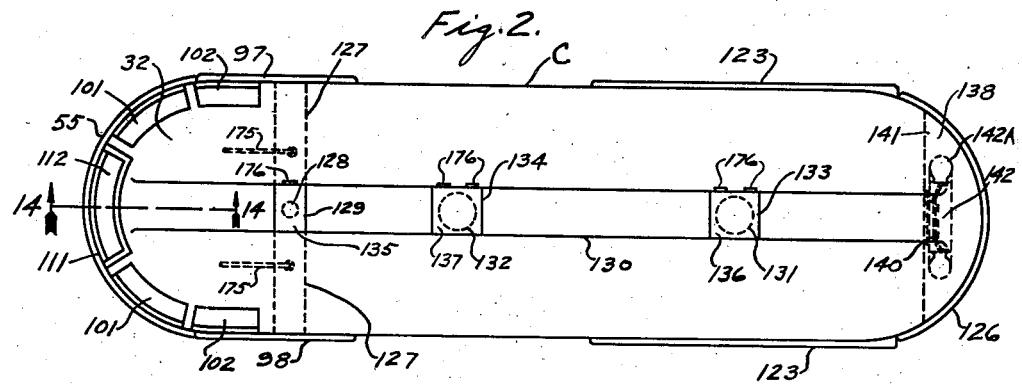
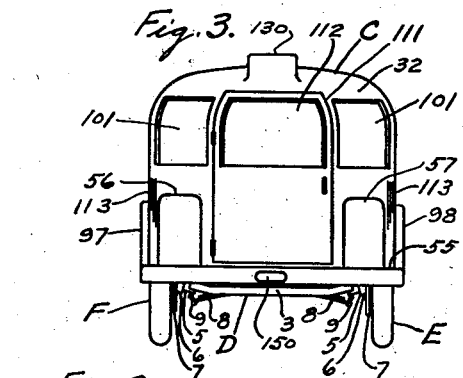
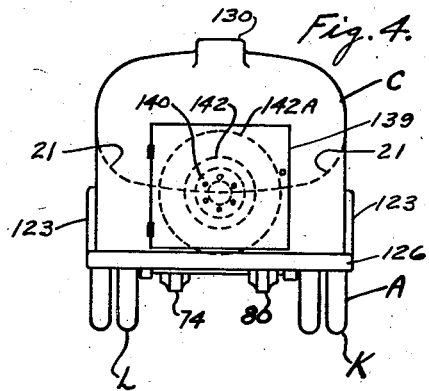
INVENTOR.
Hugh Joseph Dillon
BY
George B. Ingersoll
ATTORNEY.

Jan. 7, 1936.                       H. J. DILLON                      2,026,826
                               FRAMELESS TANK VEHICLE
                            Filed March 28, 1934         4 Sheets-Sheet 2
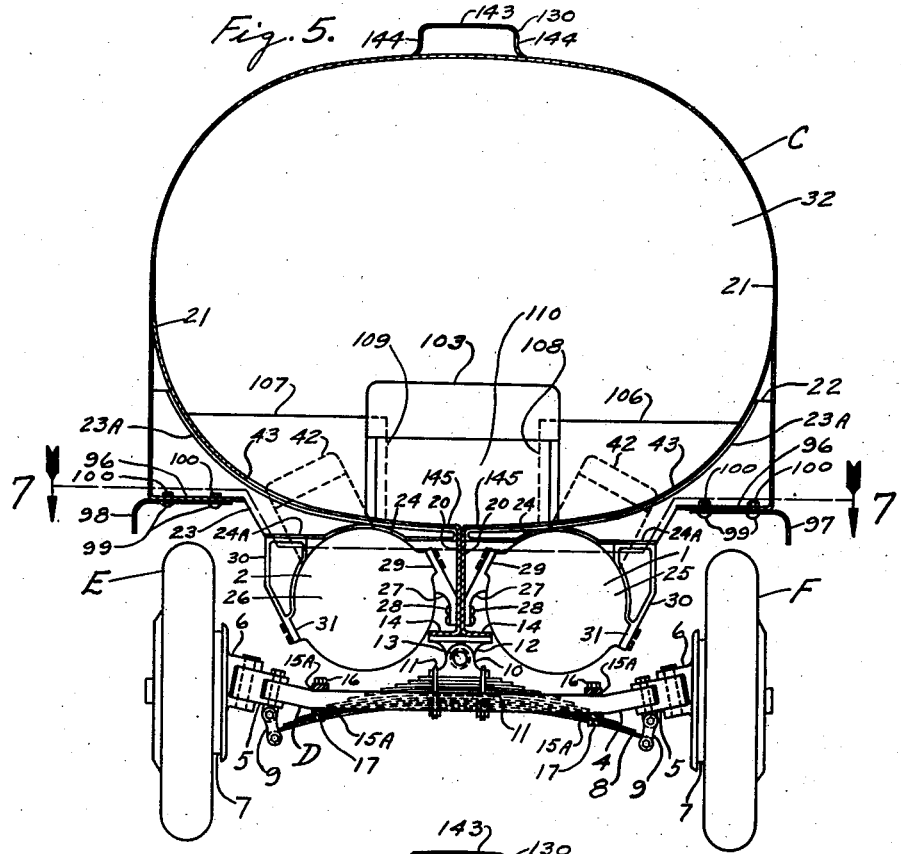
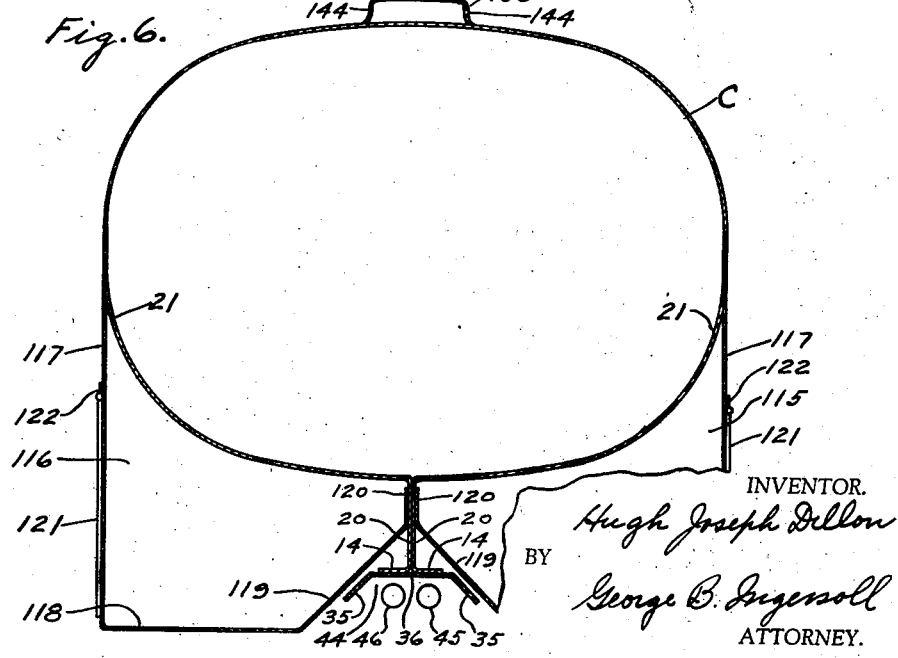
INVENTOR.
Hugh Joseph Dillon
BY George B. Ingersoll
ATTORNEY.

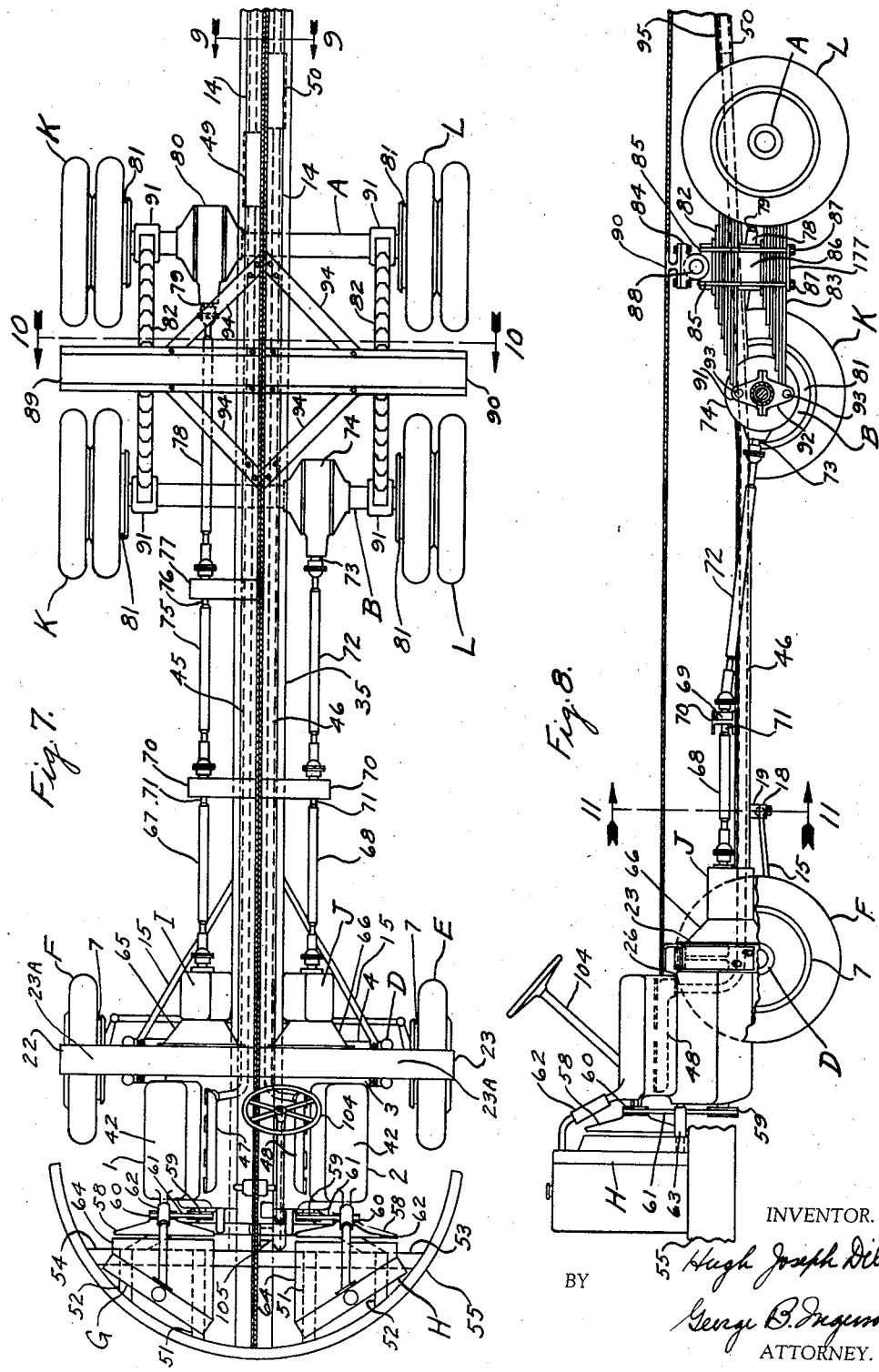

Jan. 7, 1936.                    H. J. DILLON                    2,026,826
                            FRAMELESS TANK VEHICLE
                            Filed March 28, 1934            4 Sheets-Sheet 4
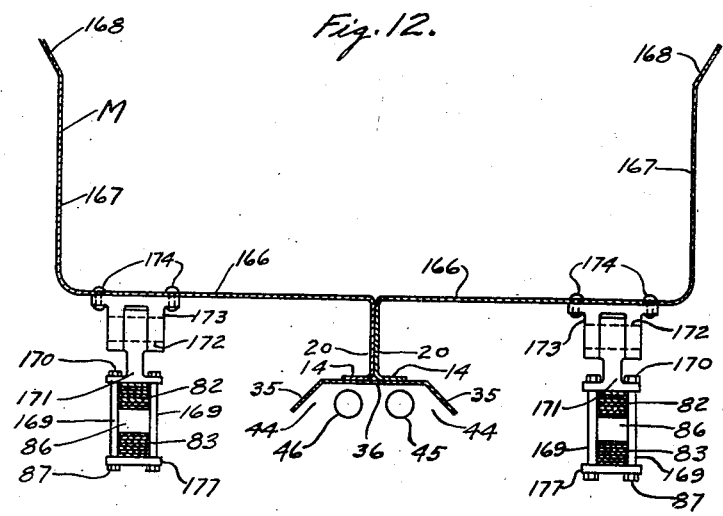
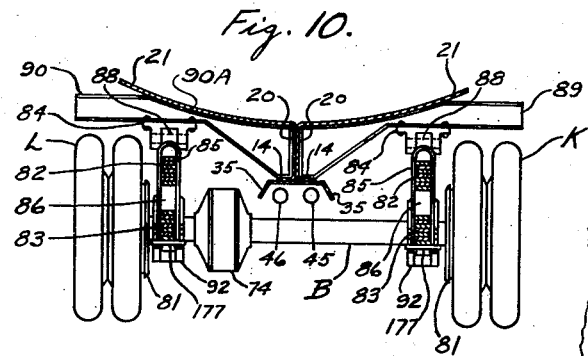
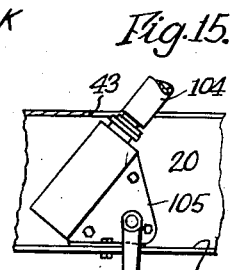
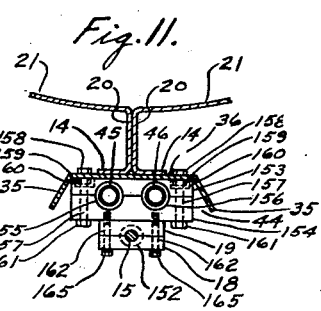
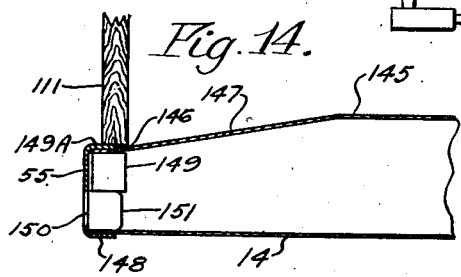
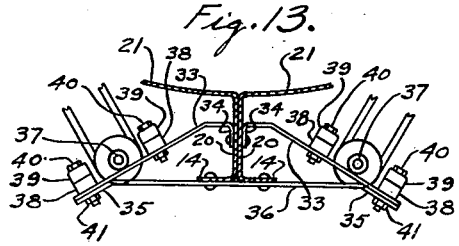
INVENTOR.
Hugh Joseph Dillon
BY
George B. Ingersoll
ATTORNEY.

Patented Jan. 7, 1936

2,026,826

UNITED STATES PATENT OFFICE 2,026,826

FRAMELESS TANK VEHICLE

Hugh Joseph Dillon, Highland Park, Mich.

Application March 28, 1934, Serial No. 717,804

21 Claims. (Cl. 280—5)

My invention relates to improvements in vehicles provided with a tank or similar tank member for supporting the load being transported; and the objects of my improvements are, first, to provide a frameless tank vehicle in which the tank or similar member is used for supporting the power and transmission units which are used for transmitting the power to the driving axles or axles of the vehicle; second, to provide a vehicle having a tank member constructed as an integral unit extending throughout the total length of the vehicle, the integral unit thus providing inherent structural strength for supporting thereon the power generating means of the vehicle; third, to provide a vehicle with a tank or similar member having its wall portions extended to form a supporting structure for the power and accessory units of the vehicle; fourth, to provide a tank unit for a vehicle having its wall portions extended to form the cab portion of the vehicle; fifth, to provide a streamline tank unit for a vehicle; sixth, to provide a vehicle having its exhaust conduit means protected by baffle means to prevent the possibility of any inflammable material, which is being transported in a tank on the vehicle, from contacting the exhaust conduit means; seventh, to provide a tank unit having an exhaust conduit baffle so constructed as to provide structural strength to the tank unit; eighth, to provide a vehicle having a pair of engine assemblies with their exhaust conduits extending longitudinally at the longitudinal center of the vehicle; ninth, to provide a tank unit with tank bracket members for supporting the tank unit on the springs of the vehicle; tenth, to provide a tank unit with tank bracket members for supporting units of the vehicle; eleventh, to provide a vehicle having axle torque members operatively connected with portions of a tank member carried by the vehicle; twelfth, to provide a tank member with means for supporting a spare wheel in a compartment thereof; thirteenth, to provide a vehicle with a tank unit having one of its compartments carrying fuel and operatively connected with the engines of the vehicle; and fourteenth, to provide a tank member having a cab compartment with portions of its floor forming a ramp member extending to a door at the front of the tank member.

I attain these objects by mechanism illustrated in the accompanying drawings, in which—

Figure 1 is a side view of the vehicle and its tank unit mounted thereon; Fig. 2, a plan view of the vehicle disclosed in Fig. 1; Fig. 3, a front end view of the vehicle disclosed in Figs. 1 and 2; Fig. 4, a rear end view of the vehicle disclosed in Figs. 1, 2, and 3; Fig. 5, a section of the vehicle taken on the line 5—5, Fig. 1; Fig. 6, a section of the tank and its side compartments together with its exhaust conduit baffle, said section being taken on the line 6—6, Fig. 1; Fig. 7, a substantially horizontal section through the tank unit below its compartments and above the chassis of the vehicle, said section being taken on the line 7—7, said view disclosing the supporting tank bracket members of the tank unit in full; Fig. 8, a side view of the chassis and the portions disclosed in Fig. 7; Fig. 9, a vertical section through the exhaust conduits and their baffle member, said section being taken on the line 9—9, Fig. 7; Fig. 10, a vertical section taken on the line 10—10, Fig. 7, said section disclosing the rear supporting tank brackets of the tank for connecting with the rear springs of the vehicle; Fig. 11, a vertical section through the means for connecting the torque members, of the front axle, with the tank unit, said section being taken on the line 11—11, Fig. 8; Fig. 12, a vertical section of an alternative design of vehicle body provided with a beam structure extending longitudinally similar to that disclosed relative to the vehicle tank unit; Fig. 13, a vertical section through the front engine support means; Fig. 14, a partial vertical section through the cab compartment taken on the line 14—14, Fig. 2, and Fig. 15, a side view of the steering gear assembly mounted on the main frame member.

Similar numerals refer to similar parts throughout the several views.

My invention is herewith disclosed with an arrangement of two engines 1 and 2 together with their accessories and operative units for operatively connecting the engines with the rear axle assemblies A and B, this arrangement of the two engines and their operatively connected parts being similar to the arrangement disclosed in my U. S. application for Vehicle, Serial Number 681,851, filed July 24, 1933, said engines and their operatively connected parts, however, being supported on a tank unit or body C as hereinafter disclosed to provide a frameless tank vehicle.

The vehicle is provided with the front axle assembly D which is similar to that disclosed and claimed in my U. S. patent application, Serial No. 681,849, filed July 24, 1933, and granted as Patent No. 1,995,500 on March 26, 1935.

The front axle assembly D is provided with a pair of axle beam members 3 and 4 connected at their ends by the bracket members 5 to form a beam supporting unit on which are pivotally supported the spindle members 6 which operatively support the wheel assemblies E and F which are provided with the brake drums 7.

The front spring 8 is located between the axle beam members 3 and 4 and extends transversely to the longitudinal center of the tank or body assembly C and is connected to the bracket members 5 by the shackles 9. The front spring 8 is connected to the spring seat 10 by the spring clips 11 and the spring seat 10 is pivotally mounted on the pin 13 which is suitably secured in the bracket 12 which is suitably secured to the flanges 14 as hereinafter disclosed. The torque member 15 is provided with the upper and lower flange portions 15A which are secured to the axle beam members 3 and 4 by the bolts 16 and the nuts 17. The torque member 15 extends diagonally rearwardly of the axle beam members 3 and 4 to a point below the flanges 14 and where the diagonally extending portions unite in the ball end 152 which is pivotally connected to the brackets 18 and 19 as more fully described hereinafter and as disclosed in Figure 11.

The tank assembly C is disclosed as being constructed for the transportation of liquids such as gasoline, fuel oil, milk and similar materials, and is provided with a suitable section to provide on its outer surfaces streamline characteristics to further provide a streamline frameless tank vehicle.

It is to be especially noted that I do not use in my invention a so-called frame assembly for supporting the tank assembly C on the chassis of the vehicle, the so-called and conventional frame assembly of the usual automotive vehicle being eliminated by constructing the wall portions of the tank assembly C so that they form a beam structure extending longitudinally approximately at the longitudinal center of the tank assembly C and the vehicle and in order to provide said beam structure extending longitudinally at the longitudinal center of the tank assembly C of the vehicle, I utilize the material used for constructing the walls of the tank assembly C and by extending them downwardly from and at the center of the tank assembly C, a structure is formed having the vertical webs, flanges, or portions 20 together with the flanges 14 extending substantially horizontally, for a portion of the length of the vehicle, from the web portions 20. In constructing the tank assembly C, the side wall portions 21 may be so formed and carried around at the bottom of the tank assembly C so that the wall portions 21 may have their opening edges brought together to form the vertical webs 20, the open edges of the vertical webs 20 being further formed to provide the horizontal flanges 14. The vertical webs 20 may be suitably secured together by welding or by riveting or similar means, thus closing the open or bottom side of the tank assembly C against leaks and at the same time providing a substantial I beam structure which extends substantially for the full length of the tank assembly C, thus not only providing a very rigid beam construction at the base of the tank assembly C for imparting rigidity and strength to the tank assembly C but also to provide means for supporting the engine assemblies 1 and 2 together with their operatively connected parts which are used for forming the driving connection with the axles of the vehicle.

It is also to be especially noted that whereas I have provided a frameless tank vehicle in which a tank assembly C is provided with a beam structure extending longitudinally thereof for imparting great rigidity and strength to the tank assembly C, I have also eliminated the trouble that is frequently encountered in providing a tank or body structure which is separated from its cab portion at a point substantially back of the front axle assembly, corresponding to a position at the rear of the cab and which thus imposes the greatest loads at a point which corresponds to the critically weak portion of the conventional frame which supports the tank or body of a vehicle unit, the elimination of said critical point in the support of the conventional frame and its tank and load being accomplished by forming the tank assembly C so that its side wall portions extend continuously and integrally through its entire length, the wall portions of the tank assembly C being further extended to form streamline closures for the end compartments of the tank assembly C, the forward compartment in my tank assembly C being utilized for the cab portion of the vehicle.

The webs 20 and the flanges 14 may be extended for the full length of the tank assembly C thus extending to the extreme front end of the vehicle. The front tank brackets 22 and 23 may be suitably formed with curved or similar surfaces 23A to fit the contour of the wall portions 20 as indicated by the size and shape of the particular tank assembly C desired, and may be suitably secured to the wall portions 21 of the tank assembly C as by welding, riveting or similar means, the front tank brackets 22 and 23 being further secured at their inner ends to the webs 20 of the tank assembly C. The brackets 22 and 23 are provided with curved surfaces 24, in their lower flanges 24A, which fit the curved surfaces of the housings 25 and 26 of the engine assemblies 1 and 2. The engine assemblies 1 and 2 are supported in the curved surfaces 24 by the inner brackets 27 which are suitably secured to the webs 20 of the tank assembly C by means of the rivets 28, said inner brackets 27 being further suitably secured to the inner supporting arms 29 of the engine assemblies 1 and 2. The housings 25 and 26 of the engine assemblies 1 and 2 are further supported in the curved surfaces 24 by the outer brackets 30 which are suitably secured to the lower flanges 24A of the front tank brackets 22 and 23, said brackets 30 being further suitably secured to the outer supporting arms 31 of the engine assemblies 1 and 2. The engine assemblies 1 and 2 are thus located and mounted on each outer side of the webs 20 of the tank assembly C and are rendered easily accessible relative to the inside of the cab compartment 32 located at the front end of the tank assembly C.

The engine assemblies 1 and 2 are further supported by the webs 20 at the front end of the tank assembly C by the brackets 33 which are provided with the flanges 34 for attaching to the webs 20 as by welding, riveting or other similar means, the bracket 33 extending adjacent and contacting the flanges 34 as by welding, riveting or similar means. The outer portions of the brackets 33 extend under the crank shaft extensions 37 of the engine assemblies 1 and 2 to support the blocks or members 38 which may be constructed of resilient material such as rubber composition or similar material, the blocks 38 supporting the lugs 39 which may be formed integrally with or suitably attached to the forward portions of the housings of the engine assemblies 1 and 2, the outer ends of the brackets 33 and blocks 38 and the lugs 39 being secured together by the bolts 40 and the nuts 41, the inner bolts 40 being suitably located as to enable the inner nuts 41 to be mounted between the brackets 33 and the member 36 as desired.

It is to be noted that the member 36 has its downwardly extending flange portions 35 located at its outer side.

It is to be noted also that the engine assemblies 1 and 2 will be supported in angular positions relative to one another and to the webs 20, the engine assemblies 1 and 2 being herein disclosed as having their cylinder portions 42 supported approximately at an angle of 35° from the vertical center line, the cylinder portions 42 extending upwardly through the apertures 43 in the lower wall portions of the cab compartment of the tank assembly as disclosed in Fig. 5.

It is to be noted that the member 36 which is suitably secured to the flanges 14 will extend for substantially the greater portion of the webs 20 and the flanges 14 and consequently the greater portion of the length of the tank assembly C, the securement of the member 36 to the flanges 14 constituting an added structural member which will greatly reinforce and impart rigidity and strength to not only the webs 20 which support the engine assemblies 1 and 2 in their operatively connected parts but also to the complete tank assembly C.

The member 36, together with its downwardly extending flange portions 35 at its outer edges will form an inverted trough 44 which will extend for substantially the greater length of the vehicle and provide a space for locating the exhaust conduits or pipes 45 and 46 which are connected with the exhaust manifolds 47 and 48 of the engine assemblies 1 and 2. The exhaust conduits 45 and 46 may be extended to the rear of the vehicle and thus provide means for conducting the hot exhaust gases from the engine assemblies 1 and 2 throughout the length of the vehicle to the rear thereof without danger of causing fire by igniting the gasoline, fuel oil or similar material being transported in the tank assembly C which may occur by leakage, etc., on the outside of the tank assembly C and which would otherwise fall on the hot exhaust conduits 45 and 46.

It is to be especially noted that the member 36 will extend across the top of the exhaust conduits 45 and 46 and should any drops or leakage of gas, fuel oil, or similar fluids strike or fall upon the member 36 it would be deflected outwardly and downwardly over the flanges 35 and so to the ground without contacting the exhaust members 45 and 46. The member 36 and its flanges 35 thus constitute a baffle member above the exhaust conduits 45 and 46 together with the mufflers 49 and 50 which may also be constructed to assemble within the trough or space 44, the mufflers 49 and 50 being suitably located in offset positions to permit the construction of the proper size and shape of muffler to fit within the space 44 as disclosed in Figs. 7 and 9.

It is to be noted that the exhaust conduits 45 and 46 together with the mufflers 49 and 50 will be suitably supported from the member 36 and the flanges 14 so that the mufflers 49 and 50 will be located in positions whereby the exhaust conduits 45 and 46 and the mufflers 49 and 50 will have no contact with the member 36 and its flange portions 35, thus avoiding any conduction of the heat of the exhaust conduits, together with their muffler means, to the member 36, as disclosed in Figs. 6 and 9.

The radiator assemblies G and H are suitably mounted in upright positions at each side of the webs 20, at the center of the tank assembly C, and are suitably supported by the members 51 and 52 which may be suitably secured to and supported at their rearward ends by the members 53 and 54, the members 53 and 54 being suitably secured at their inner ends to the webs 20 and at their outer ends to the bumper member 55 which may be formed with a semi-circular or similar shape to best conform to the shape of the cab compartment 32 and to provide proper streamline characteristics for the tank assembly C and the vehicle. The members 52 and 51 extend between the members 53 and 54 and are supported at their forward ends by the bumper member 55. The radiator assemblies G and H will thus be positioned in the proper angular position to best conform to the semi-circular shape of the forward side of the cab compartment 32, the forward wall portion of the cab being provided with suitable apertures 56 and 57 to permit air, from the outside of the tank assembly C, to be pulled or drawn through the radiator assemblies G and H by the fans 58 which are suitably connected with and operatively driven by the pulleys 59 which are suitably mounted on the crank shaft extensions 37, the pulleys 59 and the pulleys 60 of the fans 58 being operatively connected by the belts 61. The radiator assemblies G and H are suitably connected at their upper portions with the cylinder portions 42 by means of the flexible hoses 62 and with the lower portions of the engines 1 and 2 by the flexible hoses 63. The fan shrouds 64 may be suitably mounted on the radiator assemblies G and H to extend adjacent the fans 58 to permit the fans 58 to draw the air through the radiator assemblies G and H.

The engine assemblies 1 and 2 are respectively provided with the clutch housings 65 and 66 suitably supported thereon and supporting suitable conventional types of clutch mechanisms for operatively connecting the engine assemblies 1 and 2 with the transmission assemblies I and J which are suitably supported on the clutch housings 65 and 66.

The propeller shaft assemblies 67 and 68 are respectively connected with and supported at their front ends by the transmission assemblies I and J and are supported at their rear ends by suitable bearing assemblies 69 which are suitably supported by the brackets 70 which extend outwardly from the webs 20 and from the wall portions 21 of the tank assembly C, the inner race or portions of the bearing assemblies 69 being suitably secured to the extensions 71 of the propeller shaft assemblies 67 and 68. The propeller shaft assembly 72 is operatively connected with and suitably supported at its front end on the extension 71 of the propeller shaft assembly 68 and is operatively connected with and supported at its rear end on the shaft 73 which is suitably mounted in and connected with conventional pinion gears or similar driving means operatively connected with ring gears or similar driven means within the housing 74 of the driving axle assembly B.

The propeller shaft assembly 75 may be suitably mounted at its forward end on one of the bearing assemblies 69 and its extension portion 76 may be suitably mounted in another bearing assembly similar to 69 supported by the bracket member 77 which may be suitably secured to one of the webs 20 and one of the wall portions 21 of the tank assembly C. The propeller shaft assembly 78 is operatively connected with and supported at its front end on the extension 76 of the propeller shaft assembly 75 and is operatively connected with and supported at its rear end on the shaft 79 which is connected with a driving pinion or similar driving means operatively connected with a ring gear or similar driven means within the axle housing 80 of the driving axle assembly A. The rear driving axle assemblies A and B are respectively provided with conventional type of axle mechanism operatively connected with gear means suitably driven by the shafts 73 and 79, the rear driving axle assemblies A and B being provided with wheel assemblies K and L, the wheel assemblies K and L being provided with brake drums 81.

The driving axle assemblies A and B are connected by the rear springs 82 and 83 which are suitably secured to the brackets 84 by the spring clips 85, the spacer member 86, and the nuts 87, the brackets 84 being pivotally mounted on the shafts 88 which are suitably secured in brackets which are in turn suitably secured to the rear tank brackets 89 and 90 which may be formed with curved surfaces 90A for fitting the contour of the side walls 21 of the tank assembly C, the rear tank brackets 89 and 90 being further suitably secured to the webs 20 as disclosed in Fig. 10. The rear springs 82 and 83 are pivotally connected to the brackets 91 and 92 by means of the pins 93, the brackets 91 and 92 being suitably secured to the driving axle assemblies A and B. If desired the rear tank brackets 89 and 90 may be braced by the members 94 which may be suitably secured at their outer ends to the rear tank brackets 89 and 90 and at their inner ends to the webs 20 of the wall portions 21 of the tank assembly C.

It is to be noted that the driving axle assemblies A and B will be pivotally mounted on the shafts 88 which will allow the axle assemblies A and B to oscillate about the shafts 88 and thus allow free operating movement of the driving axles A and B.

It is also to be noted that the propeller shaft assembly 78 will extend over the front driving axle assembly B with sufficient clearance to allow for the oscillating movement of the driving axle assembly B together with an oscillating movement of the rear driving axle assembly A.

The webs 20 may be tapered at their lower sides as at 95 in Fig. 8 to provide a better and more economical distribution of material to withstand load stresses imposed on the tank assembly C, the flanges 14 being inclined upwardly and rearwardly to follow along the bottom of the webs 20.

The front tank brackets 22 and 23 may be further provided with flange portions 96 for providing a suitable surface for receiving and engaging the front fenders 97 and 98 which may be secured thereto by the bolts 99 and the nuts 100 or by other suitable means, the flanges 96 being suitably located to support the fenders 97 and 98 over the wheel assemblies F and E. The cab compartment 32 will be provided with the frontal windows 101 and the side windows 102 which will be located for providing proper vision for the driver while seated on the seat structure 103 which may be suitably located at the rear portion of the cab compartment 32 and at its longitudinal center.

The steering gear assembly 104 will be suitably mounted by means of the bracket 105 which is suitably secured to the webs 20 and the flanges 14, the steering gear assembly 104 being suitably located to extend through one of the openings 43 in the lower wall or floor portion of the cab compartment 32, the steering gear assembly being further suitably located to be in a convenient operating position relative to the driver when seated on the seat structure 103.

The cab compartment 32 will be further provided with suitable hood members 106 and 107 which will extend over and cover the cylinders 42 and other adjacent portions of the engine assemblies 1 and 2. The hood members 106 and 107 may be suitably mounted to swing or pivotally move upward as desired when the driver desires to inspect or work on the engine assemblies 1 and 2. The inner wall portions 108 and 109 may be fixedly mounted to separate the space occupied by the cylinders 42 from the passageway or walkway 110 which extends between the engine assemblies 1 and 2 and further extends longitudinally in the cab compartment 32 to connect the portion of the cab compartment 32 which is occupied by the seat structure 103 with the door 111 which is located at the front end of the cab compartment 32 approximately at the forward and central portion of the cab portion of the vehicle. The door 111 will be provided with the window 112 which will further provide for the vision of the driver, the door 111 further providing access for the driver to enter or leave the cab compartment 32 at the forward central portion of the vehicle.

In order to allow the escape of air from within the space covered by the hoods 106 and 107 and the wall portions 108 and 109, the cab portion of the vehicle will be provided at its sides with the louvers 113 which will thus permit the air drawn into the space covered by the hoods 106 and 107 and the wall portions 108 and 109, by the fans 58, to be forced out through the louvers 113, thus permitting the air to escape from within the cab after it has been drawn thereinto through the radiator assemblies G and H.

The steering gear assembly will be suitably connected by the steering reach rod 114 with the axle assembly D.

It is to be noted that the bumper 55 which forms a portion of and is supported by the tank assembly C will have a suitable shape to conform to the streamline shape of the cab portion of the vehicle and will extend around the front of the cab portion at its forward side, the rear ends of the bumper member being suitably connected to the front fenders 97 and 98. The tank assembly C will be further provided with the side compartments 115 and 116 which are formed by the side walls 117 which are suitably connected to the sides of the tank assembly C and to the lower wall portion 118 connecting with the inclined inner wall portions 119 which extend upwardly and are suitably connected, by the flange portions 120, with the webs 20, the inclined wall portions 119 being suitably located to provide clearance relative to the flanges 35 of the members 36. The side compartments 115 and 116 will be provided with the doors 121 which may be pivotally supported by the hinges 122, the doors 121 thus providing access to the side compartments 115 and 116. The side compartments 115 and 116 will be suitably located to extend between and connect with the rear ends of the front fenders 97 and 98 and the front ends of the rear fenders 123 which are suitably located to extend over the rear wheel assemblies K and L. The side walls 117 will be extended forwardly to form the side wall portions 124 for connecting the bumper member 55 and the side wall portions of the cab compartment 32, at the front of the vehicle, thus completing the streamline closure at the front end of the tank assembly C and the vehicle. Also the side wall 117 will be extended rearwardly to form the wall portions 125 for connecting the rear bumper member 126 and the sides of the tank assembly C.

The rear bumper 126 will be curved to extend around the rear end of the tank assembly C and will be suitably supported by being connected with the side walls of the tank assembly C and the rear fenders 123. The rear bumper 126 may be further suitably connected if desired by additional members extending to and connecting with the webs 20 or other convenient portions of the tank assembly C.

The tank assembly C will be provided with the separate tank or compartment 127 which may be located directly behind the cab compartment 32 and if desired, the front wall portion of the tank compartment 127 may provide the rear wall portion of the cab compartment 32.

The tank 127 will be made of sufficient size to carry the necessary supply of gas or similar fuel for supplying the engine assemblies 1 and 2 for driving the vehicle. The tank compartment 127 is suitably connected by suitable conduits 175 with the engine assemblies 1 and 2. The tank 127 may be provided with the filler member 128 to which access is gained through the opening 129 in the structural portion 130 at the upper longitudinal central portion of the tank assembly C. The main or load compartment of the tank assembly C may be used as one single large tank compartment or may be subdivided as is required by the type of loads to be transported. The compartments of the tank assembly C may be provided with the filler openings 131 and 132 and access is provided with the openings 131 and 132 by the openings 133 and 134. The openings 129, 133 and 134 may be suitably covered by hinged covers 135, 136, and 137, the hinges being indicated at 176, Fig. 2.

To provide streamline characteristics around the members 131, 132 and 128, the structure 130 is carried substantially through the length of the tank assembly C, the front and rear ends being gradually blended into the main portion of the tank assembly C to provide streamline characteristics.

The tank assembly C is provided with the spare tire and wheel compartment 138 at the rear of the tank assembly C, the spare tire and wheel compartment 138 being provided with the door 139 located substantially at the rear central portion of the vehicle. The bracket 140 is suitably mounted on the front wall 141 of the spare tire and wheel compartment 138 and is suitably connected to the wheel portion 142 which supports the spare tire 142A, the spare tire, together with its wheel supporting member, thus being suitably carried within the spare tire compartment 138, within the tank assembly C.

The structure 130 is provided with the upper wall portion 143 and the side wall portion 144 and thus provides additional means for imparting strength and rigidity to the cab compartment 32 and the main load compartment of the tank assembly C, the side walls 144 being suitably connected to the upper or top wall portion of the tank assembly C.

It is to be noted that the openings 43 when formed in the bottom or floor portion of the cab compartment 32 of the tank assembly C will leave portions 145 of the side wall portions 21 of the tank assembly C, said portions 145 remaining to extend forwardly to the front end of the cab, the front portion of the remaining wall portions 145 being inclined downwardly and forwardly to permit the end portions 146 thereof to fit adjacent and be secured to the upper flange portions 149A of the front bumper member 55. Thus a portion of the wall portions 145 will form a ramp or inclined floor portion as at 147 in Fig. 14 by which the driver, when entering through the door 111, may walk between the engine assemblies 1 and 2 and along the passageway or walkway 110 to reach the seat structure 103. The flanges 14 will also be suitably secured to the lower flange 148 of the bumper member 55. Also if desired, the web portions 20 may be suitably secured by the bracket members 149 to the vertical web portion of the front bumper member 55, the bracket members 149 being suitably secured to the webs 20 and the bumper member as disclosed in Fig. 14. In order to provide a place for the driver to place his foot when mounting through the door 111, the front bumper member may be provided with the opening 150, the web portions 20 being provided with the cut-away portions 151 to provide room for the driver's foot as it is inserted in the opening 150 disclosed in Fig. 14.

The opening 150 in the front bumper member, together with the cut-away portion 151 adjacent the door 111 which provides an entrance to a ramp between a pair of engine assemblies is similar to and represents a modified design of the cab and associated members as disclosed and claimed in my U. S. patent application for Vehicle cab, Serial No. 681,850, filed July 24, 1933.

In order to provide a suitable connection for the ball end 152 of the torque member 15 at the underside of the trough or space 44 through which extend the exhaust conduits 45 and 46, I provide a pair of brackets or members 153 and 154 which when assembled together are provided with the openings 155 and 156 therethrough for receiving the exhaust pipes 45 and 46.

The brackets 153 and 154 will be suitably secured together by the studs 157 which extend through the bracket members 153 and 154 and are suitably secured by the nuts 158 and 159, the bracket member 153 being provided with recesses 160 for receiving the nuts 159 therein. Thus the studs 157 are secured in their assembled position by the nuts 158 and 159 and the bracket members 153 and 154 are secured on the stud by the nuts 161.

It is to be noted that the brackets 153 and 154 will provide means for supporting the studs 162 which extend through and support the brackets 18 and 19 which are provided with suitable socket portions for engaging and enclosing the ball portion 152 of the torque member 15, the brackets 18 and 19 being secured in their assembled positions by the nuts 165.

It is to be noted that the above disclosed structure will provide means for supporting the swivel end of the torque member 15 and at the same time provide means for readily disassembling the exhaust conduits 45 and 46 when required.

It is to be noted that the member 36 need not extend forwardly of the front end of the engine assembly unless it is desired or needed as a structure member to provide rigidity and strength to the forward part of the tank assembly C and the vehicle.

In Fig. 12, I disclose an alternative design by means of which the webs 20, together with their flanges 14 and the member 36 may be utilized for supporting the operating units of the vehicle when the vehicle is provided with an open type of body at the rear of the cab portion of the vehicle. In the design disclosed in Fig. 12, the webs 20 will be provided at the central portion of the open body structure M, the body structure M being provided with the bottom or floor wall portion 166 which correspond to the wall portions 21 of the tank assembly C. The wall portions 166 may be extended and connected with the side wall portions 167 and the side wall portions may be extended upwardly and provided with flanged portions 168. In the design disclosed in Fig. 12 the use of the rear tank bracket members 89 and 90 are dispensed with and the springs 82 and 83 together with the spacer member 86 may be secured by the bolts or studs 169 together with the plate 177, the nuts 87 and 170 to the bracket 171 which may be pivotally mounted on the pin 172 which is supported in the bracket 173 which is suitably secured to the lower or floor wall portions 166 of the body structure M by the rivets 174 or similar means, thus eliminating the use entirely of the conventional and separate frame structure as found in motor vehicles, the open body structure M providing the means for supporting the various operative units of the vehicle in a similar manner to that disclosed in reference to the tank assembly C of my invention.

It is also to be understood that if it is desired to form the lower wall or portions of the tank assembly C with a shape corresponding to the wall portions 166 in Fig. 12 then the rear tank brackets 89 and 90 may be dispensed with and the springs 82 and 83 mounted substantially as disclosed in Fig. 12.

It is to be noted that the rear fenders 123 may be supported by being suitably secured to the rear tank brackets 89 and 90.

It is to be noted that the I beam structure at the lower longitudinal center of the tank assembly C may be constructed by utilizing additional reinforcing members attached to the vertical webs 20. Also if desired the web portions 20 may be constructed by suitably securing a structure having flanges to the bottom side of the lower wall portions 21 of the tank assembly C, said additional member being provided with the web portions 20. This alternative construction of the I beam structure may be utilized if it is desired to make the I beam structure a separate unit secured to the wall members of the tank assembly C instead of actually extending over the edges of the wall portions 21 to form said I beam structure.

I claim:

1. In a vehicle having a pair of engines together with driving and steering axles each provided with resilient supporting members together with power transmission mechanisms operatively connecting the driving axles with the pair of engines, said steering axle comprising a torque arm mechanism, the combination of a tank assembly having a beam structure extending longitudinally of and at the lower side of the tank assembly, support means connected with said beam structure and supporting the power transmission mechanisms operatively connecting the driving axles with the pair of engines, a pair of front tank bracket members secured to the wall portions of said tank assembly and to said beam structure and each having curved surfaces for receiving portions of the engines, means for securing the engines to said beam structure, a pair of rear tank bracket members secured to the wall portions of said tank assembly and to said beam structure, said pair of rear tank bracket members being connected with the resilient supporting members of the driving axles, pivot means connecting the resilient supporting members of the steering axle with said beam structure, and pivot means connecting the torque arm mechanism of the steering axle with said beam structure.

2. In a vehicle for transporting material and provided with power developing means, the combination of a tank member provided with a beam structure connected to its bottom wall portion, and means for supporting the power developing means on said beam structure and adjacent the sides thereof, said power developing means being supported with its axis located below the bottom wall portion of said tank member.

3. In a vehicle having power developing means, the combination of a body assembly provided with load carrying and cab compartments, said body assembly being provided with a wall structure forming the lower wall of said load carrying and said cab compartments, said wall structure comprising a beam structure, the portion of said wall structure forming the lower wall of said cab compartment being provided with openings to permit portions of the power developing means of the vehicle to extend into said cab compartment of said body assembly, and means for supporting the lower wall of an engine assembly on said beam structure of said wall structure forming the lower wall of said compartments.

4. In a vehicle having a pair of engine assemblies, the combination of a tank assembly provided with a cab compartment having its lower wall structure provided with a pair of openings to permit portions of the engine assemblies to extend into said cab compartment, said cab compartment having a portion of its lower wall structure located between said pair of openings to form a walkway extending between said pair of engine assemblies, and means for supporting the engine assemblies below said lower wall structure of the cab compartment.

5. In a vehicle provided with wheels and fenders, the combination of a tank assembly, bracket members secured to the bottom wall portion of said tank assembly and each provided with an extension portion extending over said wheels, said extension portions of said bracket members being provided with a surface on its under side conforming with the shape of and adapted to receive the fenders therein, and means for attaching said fenders to said bracket members.

6. In a vehicle having a pair of engine assemblies, the combination of a tank assembly provided with a cab compartment extending over the pair of engine assemblies, the floor of the cab compartment being provided with openings adjacent the pair of engine assemblies, said tank assembly being provided with a structure extending between said pair of engines and supporting the floor of the cab compartment, said portion of the floor extending between the pair of engine assemblies being inclined downwardly and forwardly to the front of the cab compartment, a door suitably mounted at the forward side of said cab compartment adjacent the inclined portion of said floor, a bumper member adjacent the lower side of said door, said bumper member being connected with and supported by said structure supporting the floor of said cab compartment, a seat structure suitably mounted at the rear of said cab compartment, and hood members suitably mounted in said cab compartment and extending over said pair of engine assemblies.

7. In a vehicle provided with power developing means, the combination of a tank assembly provided with an upper reinforcing structure extending longitudinally substantially at the top longitudinal center of the tank assembly, said tank assembly being further provided with a lower reinforcing structure extending substantially at the lower longitudinal center of the tank assembly, bracket members secured to the bottom side of said tank assembly and to the sides of said lower reinforcing structure, and bracket members securing the power developing means to said lower reinforcing structure and to said first mentioned bracket members.

8. In a vehicle having power developing means, together with exhaust conduits extending therefrom substantially at the longitudinal center of the vehicle, the combination of a tank, and an inverted trough structure suitably supported to extend substantially at the longitudinal center of said tank, said inverted trough structure being spaced from the wall portions of said tank and extending over said exhaust conduits to prevent any leakage from said tank from contacting said exhaust conduits.

9. In a vehicle having power developing means and a tank, together with a pair of exhaust conduits extending from the power developing means and connecting with a pair of mufflers, an inverted trough structure suitably mounted to extend over said pair of exhaust conduits and said pair of mufflers, said inverted trough structure being mounted in spaced relationship to said pair of exhaust conduits and said pair of mufflers, said inverted trough structure being spaced away from and below the wall portion of the tank.

10. In a vehicle provided with engines having exhaust conduits connected therewith, the combination of a tank provided with a supporting structure extending longitudinally substantially at the center of the tank at its lower side, said supporting structure being provided with an inverted trough portion, and a pair of load compartments oppositely disposed about the longitudinal center of said supporting structure of said tank, said load compartments having their lower walls extending angularly toward and connected with said supporting structure, the angular walls of said compartments extending over said exhaust conduits and said inverted trough portion, said inverted trough portion being located between said exhaust conduits and the lower walls of said load compartments extending angularly toward and connecting with said supporting structure.

11. In a vehicle, a tank assembly having its lower wall portions only extended to form a vertical web structure extending longitudinally substantially at the longitudinal center of the tank, said lower wall portions being further extended to provide flanges oppositely disposed and extending from said structure.

12. In a vehicle having a torque member operatively connected with an axle, said vehicle being further provided with power developing means having exhaust conduit means extending therefrom, the combination of a tank assembly provided with a beam structure extending longitudinally substantially at the lower longitudinal center of said tank assembly, a baffle member supported by said beam structure of said tank assembly, said baffle member extending over the exhaust conduit means of the vehicle, and means for swivelly supporting one end of the torque member of the vehicle, said means being provided with openings for receiving the exhaust conduit means therethrough, said last mentioned means being supported by said baffle means and said beam structure of said tank assembly.

13. In a vehicle provided with power developing and transmitting units, a body having its sides extended to form a sole beam structure extending longitudinally substantially at the longitudinal center of and at the lower side thereof, said sole beam structure having a substantial depth and adapted to support the power developing and transmitting units.

14. In a vehicle, a tank comprising a sheet of material folded to form a compartment having top, side and lower walls constructed from said sheet, said lower walls being connected at the lower side of said tank to close said tank, said lower walls being extended to form a beam structure having a vertical section extending longitudinally at the longitudinal center of the tank and the vehicle, said beam structure being provided with a flange extending angularly relative to said vertical section.

15. In a vehicle, a tank comprising a pair of compartments and a sheet of material folded to provide top, side and lower walls of said pair of compartments, said lower walls being connected at the lower side of said tank to close said tank, said lower walls being extended to form a beam structure extending longitudinally below and at the longitudinal center of said pair of compartments of said tank, said beam structure being provided with a flange extending substantially in a horizontal plane, said beam structure being adapted to absorb loads imposed on said tank at or adjacent the junction of said pair of compartments.

16. In a vehicle comprising power developing means, the combination of a tank having lower walls extended to form a beam structure extending longitudinally at the longitudinal center of said tank and the vehicle, bracket members connected to the lower walls of said tank and to said beam structure, and means for securing the power developing means to said brackets and said beam structure.

17. In a vehicle comprising a steering axle and a driving axle mechanism, together with resilient means connected with each of said axle mechanisms, the combination of a tank member provided with a beam structure extending longitudinally at the longitudinal centers of the vehicle and said tank and at the lower side of said tank, means operatively connecting the resilient means of said steering axle mechanism with said beam structure, and means operatively connecting the resilient means of said driving axle mechanism to the lower side walls of said tank.

18. In a vehicle, the combination of a tank comprising a plurality of compartments having top, side and bottom walls, said tank being provided with a filler opening in the top wall portion of said compartments, a structure enclosing said filler opening and extending longitudinally at the longitudinal center of said tank and the vehicle, said filler opening in the top wall portion of said compartments being located wholly below the uppermost surface of said structure, said structure having its ends gradually decreased in height to join the top walls of said tank, and a beam structure extending longitudinally at the longitudinal center of said tank and the vehicle, said beam structure being connected to the lower wall of said tank and extending downwardly therefrom, said first mentioned structure and said beam structure cooperating to provide greater rigidity to said tank.

19. In a vehicle, the combination of a vehicle comprising power developing means having exhaust conduits connecting therewith, the combination of a tank having a beam structure extending longitudinally at the lower side of said tank, and a member mounted on said beam structure and extending over said exhaust conduits to form a baffle therefor, said member further forming a reinforcing member to cooperate with said beam structure to add rigidity to said tank.

20. In a vehicle comprising a pair of engines provided with inclined cylinders, the combination of a tank provided with a cab compartment, said tank having its lower side extended to form a beam structure extending longitudinally at the lower side of said tank and its cab compartment and between the inclined cylinders of said pair of engines, the lower side of said cab compartment being provided with openings therein to receive the inclined cylinders, said lower side of said cab compartment having a portion of its wall portions extending between said openings and over said beam structure to form a walkway between said inclined cylinders of said pair of engines.

21. In a vehicle provided with a tank assembly, the combination of a tank provided with a main compartment together with end compartments, said tank having rounded end portions provided with roof portions inclined upwardly and inwardly to connect with the roof portion of said main compartment of said tank assembly, and a reinforcing beam structure extending longitudinally at the upper side of said main compartment of said tank assembly, said reinforcing beam structure having its ends inclined downwardly and outwardly to join the upwardly and inwardly extending roof portions of the rounded end portions of said end compartments of said tank assembly.

HUGH JOSEPH DILLON.